(12) United States Patent
Cheng

(10) Patent No.: US 9,731,184 B2
(45) Date of Patent: Aug. 15, 2017

(54) EXERCISE ASSISTIVE DEVICE

(71) Applicant: bOMDIC Inc., Hsinchu (TW)

(72) Inventor: Shih-Heng Cheng, Hsinchu (TW)

(73) Assignee: bOMDIC Inc., Taipei (TW)

( * ) Notice: Subject to any disclaimer, the term of this patent is extended or adjusted under 35 U.S.C. 154(b) by 415 days.

(21) Appl. No.: 14/460,339

(22) Filed: Aug. 14, 2014

(65) Prior Publication Data

US 2015/0051721 A1 Feb. 19, 2015

Related U.S. Application Data

(63) Continuation of application No. 61/867,229, filed on Aug. 19, 2013.

(51) Int. Cl.
*A63B 24/00* (2006.01)
*A63B 71/06* (2006.01)
*G06K 9/00* (2006.01)

(52) U.S. Cl.
CPC ........... *A63B 71/06* (2013.01); *G06K 9/0055* (2013.01)

(58) Field of Classification Search
CPC . A63B 71/06; A63B 2230/00; A63B 2230/04; A63B 2230/06; A63B 2230/065; G06K 9/0055
USPC .......................................................... 700/91
See application file for complete search history.

(56) References Cited

U.S. PATENT DOCUMENTS

| | | |
|---|---|---|
| 5,615,685 A | 4/1997 | Suga |
| 6,605,038 B1 * | 8/2003 | Teller ..................... A61B 5/411 128/904 |
| 2005/0054940 A1 * | 3/2005 | Almen ............... A61B 5/02405 600/509 |
| 2006/0032315 A1 | 2/2006 | Saalastic et al. |
| 2006/0252602 A1 * | 11/2006 | Brown ............... A63B 24/0084 482/9 |
| 2008/0033581 A1 * | 2/2008 | Doshi ................ A63B 24/0084 700/92 |
| 2008/0214903 A1 * | 9/2008 | Orbach .................. G06Q 50/22 600/301 |
| 2011/0021319 A1 * | 1/2011 | Nissila ................... A61B 5/222 482/8 |
| 2011/0066009 A1 * | 3/2011 | Moon .................. A61B 5/0002 600/301 |
| 2014/0074407 A1 | 3/2014 | Hernandez-Silveira |
| 2015/0051721 A1 | 2/2015 | Cheng |

(Continued)

FOREIGN PATENT DOCUMENTS

| | | |
|---|---|---|
| CN | 1291904 | 4/2001 |
| CN | 2748033 | 12/2005 |

(Continued)

OTHER PUBLICATIONS

Gaurav, "GoMore—World's first wearable stamina fitness sensor for workout addicts", Damn Geeky, Dec. 26, 2014.

(Continued)

*Primary Examiner* — Allen Chan
(74) *Attorney, Agent, or Firm* — Steven Reiss

(57) ABSTRACT

The present disclosure provides an exercise assistive device. The present disclosure also provides a method for estimating stamina level and a method for adjusting stamina category. The present disclosure further provides the several types and applications of the exercise assistive device.

33 Claims, 24 Drawing Sheets

(56) References Cited

U.S. PATENT DOCUMENTS

2015/0250417 A1    9/2015  Cheng et al.

FOREIGN PATENT DOCUMENTS

CN      102098961       6/2011
TW      201328660 X     7/2013

OTHER PUBLICATIONS

Jared Newman, "Wearables go niche and narrow in the search for consumer relevance", PCWorld, Jan. 12, 2015.
Exercise Smarter by Managing Your Stamina in Real Time With GoMore, PR Newswire, Mar. 5, 2015.

* cited by examiner

Stamina Category

SC1   Rarely Exercise            (*Anaerobic 20sec)

⋮     Occasionally Exercise

SC4   Normal                   (*Anaerobic 60sec)

⋮     Regular Exercising

SC7   Advanced Exercising   (*Anaerobic 2mins)

⋮     Amateur Sportsman

SC10  Professional Sportsman   (*Anaerobic 5mins)

FIG. 6

EXERCISE ASSISTIVE DEVICE

FIELD OF THE INVENTION

The present invention relates generally to an exercise assistive device. More specifically, the present invention relates to an exercise assistive device and method for indicating stamina of a user and providing notification based on certain conditions.

BACKGROUND OF THE INVENTION

Professional athletes, sports enthusiasts or people who like exercise often evaluate their own physical conditions during exercises, and thus configure their own physical strengths in order to complete an exercise or a competition. Typically, people evaluate their own physical conditions and environmental factors before or during an exercise to adjust their workouts. In addition, after an exercise, people record and analyze their physical strengths and endurances as references for the next exercise.

Recently, various types of exercise assistive devices have been developed to assess a user's physical strength in real-time. These devices are capable of providing users with their own physiological signals during exercise, and providing the user with exercise history records for browsing after exercise, and sharing the records with social networks. However, the indication of physiological signal, such as heart rate, often cannot be reliably and accurately correlated to the user's physical strength and endurance. Namely, the provision of only the physiological signal is of no or little effect for the user to decide when the used needs to decrease or increase the intensity during the exercise (i.e. when to slow down or speed up during marathon).

In view of the above, what is needed is an exercise assistive device and method which reliably indicates a stamina level of each of the users regardless of the differences of the physical condition among each of the users.

BRIEF SUMMARY OF THE INVENTION

In view of the foregoing subject, a general objective of the present invention is to provide a device or a method to reliably and accurately indicate the user's stamina. More specifically, a more specific objective of the present invention is to provide an exercise assistive device that appropriately transforms the user's physical strength into stamina, which can be utilized or visualized in various ways.

The invention generally provides a method for managing an exercise assistive device, comprising: setting an initial stamina category based on biological information of a user or information of a stored stamina category in the exercise assistive device; sensing a physiological signal of the user; estimating a stamina level based on the physiological signal and the initial stamina category; sending a notification when the stamina level reaches a first threshold; adjusting the initial stamina category if the stamina level reaches below the first threshold and meets a first condition or a second condition, wherein the first condition is met if the stamina level continuously remains between the first threshold and a second threshold for a first time period, and the second condition is met if the stamina level reaches below the second threshold; and updating information of the stored stamina category based on the adjustment of the initial stamina category.

The invention also provides an exercise assistive device, comprising: a strap; and an enclosure positioned at the vicinity of a user's heart by the strap, comprising: a sensor module having at least one electrode to sense an ECG signal of the user; an user interface adapted to receive biological information and send notification when a stamina level reaches a first threshold; a storage module adapted to store at least one mathematical model and a stored stamina category; and a processing module adapted to (1) determine an initial stamina category based on the biological information of the user or information of the stored stamina category in the storage module, (2) estimate a stamina level based on the ECG signal and the initial stamina category, (3) adjust the initial stamina category if the stamina level reaches below the first threshold and meets a first condition or a second condition, wherein the first condition is met if the stamina level continuously remains between the first threshold and a second threshold for a first time period, and the second condition is met if the stamina level reaches below the second threshold, and (4) update information of the stored stamina category in the storage module based on the adjustment of the initial stamina category.

The invention further provides an exercise assistive device, comprising: a strap; and an enclosure positioned directly or indirectly on a user's skin by the strap, comprising: a sensor module having at least one optical sensor to sense a physiological signal of a user; an user interface adapted to receive biological information and send notification when a stamina level reaches a first threshold; a storage module adapted to store at least one mathematical model and a stored stamina category; and a processing module adapted to (1) determine an initial stamina category based on the biological information of the user or information of the stored stamina category in the storage module, (2) estimate a stamina level based on the physiological signal and the initial stamina category, (3) adjust the initial stamina category if the stamina level reaches below the first threshold and meets a first condition or a second condition, wherein the first condition is met if the stamina level continuously remains between the first threshold and a second threshold for a first time period, and the second condition is met if the stamina level reaches below the second threshold, and (4) update information of the stored stamina category in the storage module based on the adjustment of the initial stamina category.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein:

FIG. 6 a schematic illustration of the relationship between exemplary stamina categories and the fitness condition of a user.

In accordance with common practice, the various described features are not drawn to scale and are drawn to emphasize features relevant to the present disclosure. Like reference characters denote like elements throughout the figures and text.

DETAILED DESCRIPTION OF THE INVENTION

Figure 1:
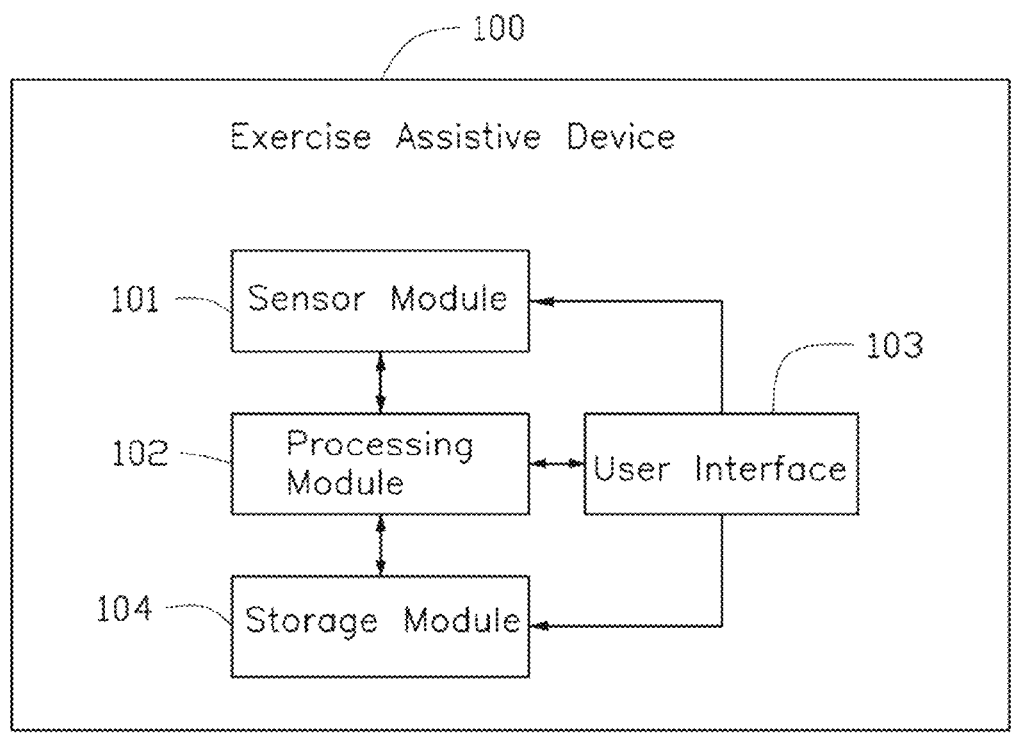
FIG. 1 is a schematic block diagram of an exercise assistive device according to at least one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The description will be made as to the embodiments of the present invention in conjunction with the accompanying drawings in FIGS. 1-18. Reference will be made to the drawing figures to describe the present invention in detail, wherein depicted elements are not necessarily shown to scale and wherein like or similar elements are designated by same or similar reference numeral through the several views and same or similar terminology.

FIG. 1 is a schematic block diagram of an exercise assistive device according to at least one embodiment of the present invention.

Referring to FIG. 1, the exercise assistive device 100 includes a sensor module 101, a processing module 102, a user interface 103 and a storage module 104.

The sensor module 101 includes at least one sensor for sensing and measuring physiological signals of the user. For example, the physiological signal comprises at least one of (1) fatigue signal such as heart rate, breathing pattern, and movement speed, (2) energy signal such as glycogen concentration, and oxygen concentration, and (3) activity signal such as exercise intensity. In addition, the activity signal can be monitored by at least one of a gyroscope, an accelerometer, a step counter, a cadence monitor, a speedometer, and a power meter.

The processing module 102 is hardware such as a microcontroller or a microprocessor with auxiliary circuits that carries out the instructions of a computer program by performing the basic arithmetical, logical, and input/output operations of the exercise assistive device.

The user interface 103 comprises at least one output and/or at least one input, or any combination thereof. The output can be a display, a vibrating component or a speaker, or any combination thereof for stating the user's stamina level during or after the exercise of a user. The input can be any human-machine interface such as a touch-panel, a voice receiver or a button that is capable of receiving biological information from the user, such as height, weight, age, gender and so forth. In addition, the user interface 103 can be adapted to send information directly to the sensor module 101, the processing module 102 or the storage module 104.

The storage module 104 can be any type of disk or memory for storing information from the sensor module 101, the processing module 102 or the user interface 103. For example, the stored information can be activity history or biological information of the user, and the aforementioned information can be used to calculate the user's stamina level and can be used to calculate the user's initial stamina category, since the activity history or the biological information can be used to calculate a base blood lactate level, a base heart rate, a base oxygen intake rate, or any combination thereof that associates with a rest state of the user.

It should be noticed that the term, stamina, refers to the ability of an organism to exert itself and remain active for a period of time. Furthermore, the concept of the stamina level and the stamina category will be brought out in the following paragraphs.

Referring back to FIG. 1, the processing module 102 receives the physiological signal from the sensor module 101 and processes based on the physiological signal and the instructions stored in the storage module 104, and provides processed information as results to the user interface 103. In addition, the processing module 102 can also receives instructions from the user interface 103 as input and carries out the instructions with or without the information stored in the storage module 104, and provides commands to operate the sensor module 101.

The sensor module 101, the processing module 102, the user interface 103 and the storage module 104 can be configured with wired or wireless connection. The wired connection can be any type of physical contact, for example, an electric cable or conduct lines on printed circuit board. The wireless connection can be any type of wireless transmission, such as WiFi, Bluetooth, or radio frequency assisted transmission.

Figure 2A:
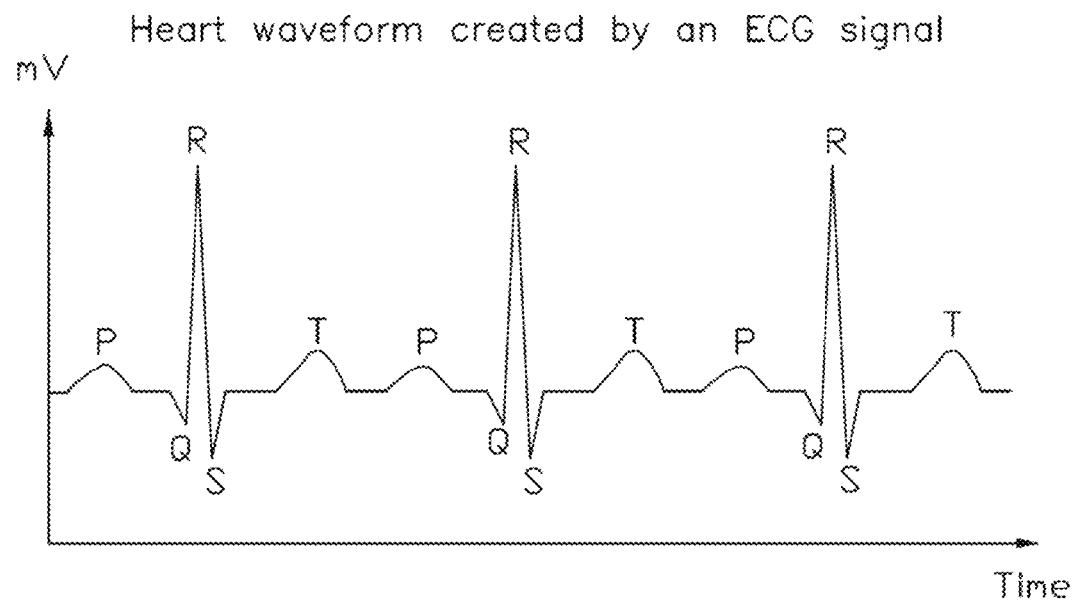
FIGS. 2A and 2B are schematic illustrations of heart waveform created by an ECG signal or by a signal detected from an optical sensor, respectively, according to at least one embodiment of the present invention.
Figure 2B:
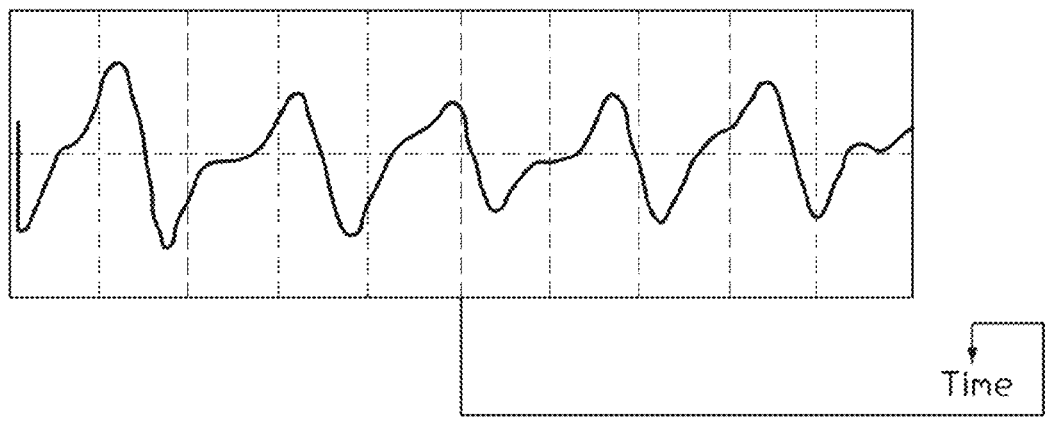

FIGS. 2A and 2B are schematic illustrations of heart waveform created by an ECG signal or by a signal detected from an optical sensor, respectively, according to at least one embodiment of the present invention.

Referring to FIG. 2A, in the sensor module 101 of the exercise assistive device 100, the sensor for monitoring heart rate can be an electrocardiography (ECG) sensor Referring to FIG. 2B, in the sensor module 101 of the exercise assistive device 100, the sensor for monitoring heart rate can be an optical sensor. Since the optical sensor is sensitive to artifacts such as other heart related signals and body movements, which interfere with the actual heart rate signal and reduce the accuracy of the heart rate reading, the ECG sensor is preferred over the optical sensor as the ECG sensor senses P, Q, R, S and T waves from different operational stages of the heart. The artifacts in an ECG signal can be distinguished from the PQRST waves, thus removing the artifacts to provide an accurate heart rate reading. Namely, the heart rate of a user is determined based on the time intervals between specific ECG waves. For example, the time interval between each consequent T wave or R wave corresponds to the time between each heartbeat. In addition, the ECG signal is used to filter noises through the identification of its specific characteristics of waveform, such as T wave, thus preventing taking irrelevant artifacts in to consideration of heart rate calculation.

Figure 3A:
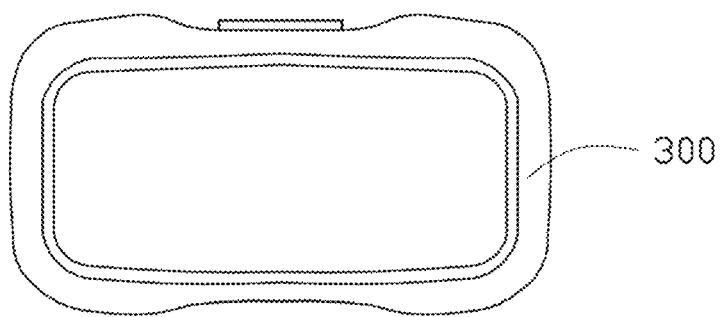
FIGS. 3A to 3C are schematic illustrations of an exemplary exercise assistive device according to one embodiment of the present invention.
Figure 3B:
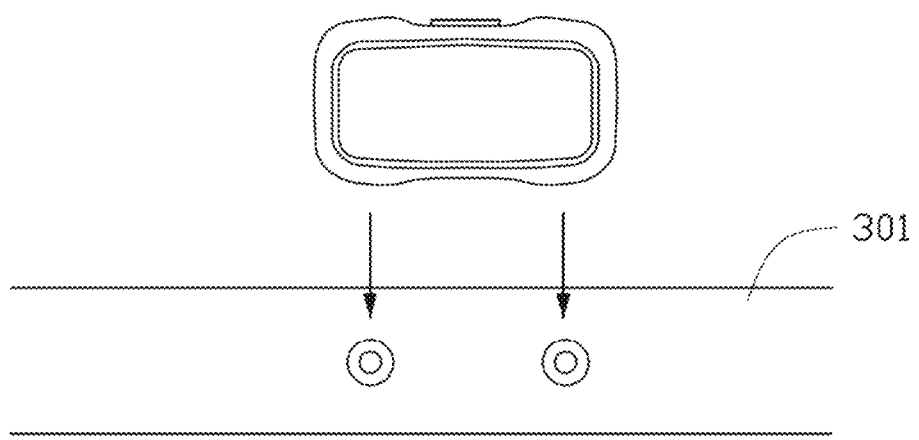
Figure 3C:
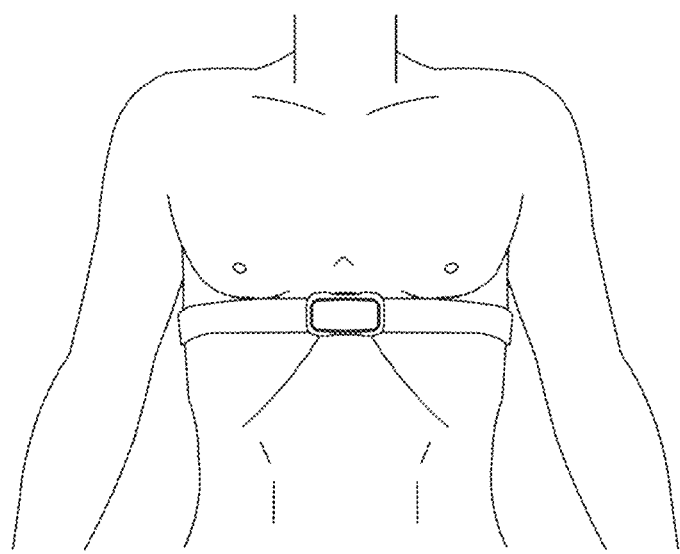

FIGS. 3A to 3C are schematic illustrations of an exemplary exercise assistive device according to one embodiment of the present invention.

Referring to FIGS. 3A to 3C, the exercise assistive device 300 may be a single device having enclosure that comprises at least one of the sensor module 101, the processing module 102, the user interface 103 and the storage module 104. Also, the exercise assistive device 300 may be a single device having enclosure that comprises all of the sensor module 101, the processing module 102, the user interface 103 and the storage module 104. The exercise assistive device 300 may be part of a wearable device to be worn around a human's body part, for example, chest, a wrist, an arm, waist, or a leg, to sense and measure the physiological signals from the body part of the user.

Referring to FIG. 3A, the exercise assistive device 300 comprises an enclosure that houses a sensor module 101, a processing module 102, a user interface 103 and a storage module 104. Referring to FIG. 3B, the exercise assistive device 300 also comprises an strap 301 (i.e. an elastic band) for strapping the exercise assistive device 300 around a user's chest and positioning the exercise assistive device 100 at the vicinity of the user's heart. In addition, the sensor module 101 of the exercise assistive device 300 may has at least one electrode (i.e. two electrodes connected with the strap) to sense an ECG signal of the user. Referring to FIG. 3C, the exercise assistive device 300 having the strap 301 is worn around a user's chest and thus the ECG signal of the user's heartbeat can be sensed. Furthermore, the exercise assistive device 300 also comprises a vibrating component within the enclosure for sending vibrating notifications to the user according to the change in the stamina level during the exercise of the user. Again, it should be noticed that the concept of the stamina level will be brought out in the following paragraphs.

Figure 4:
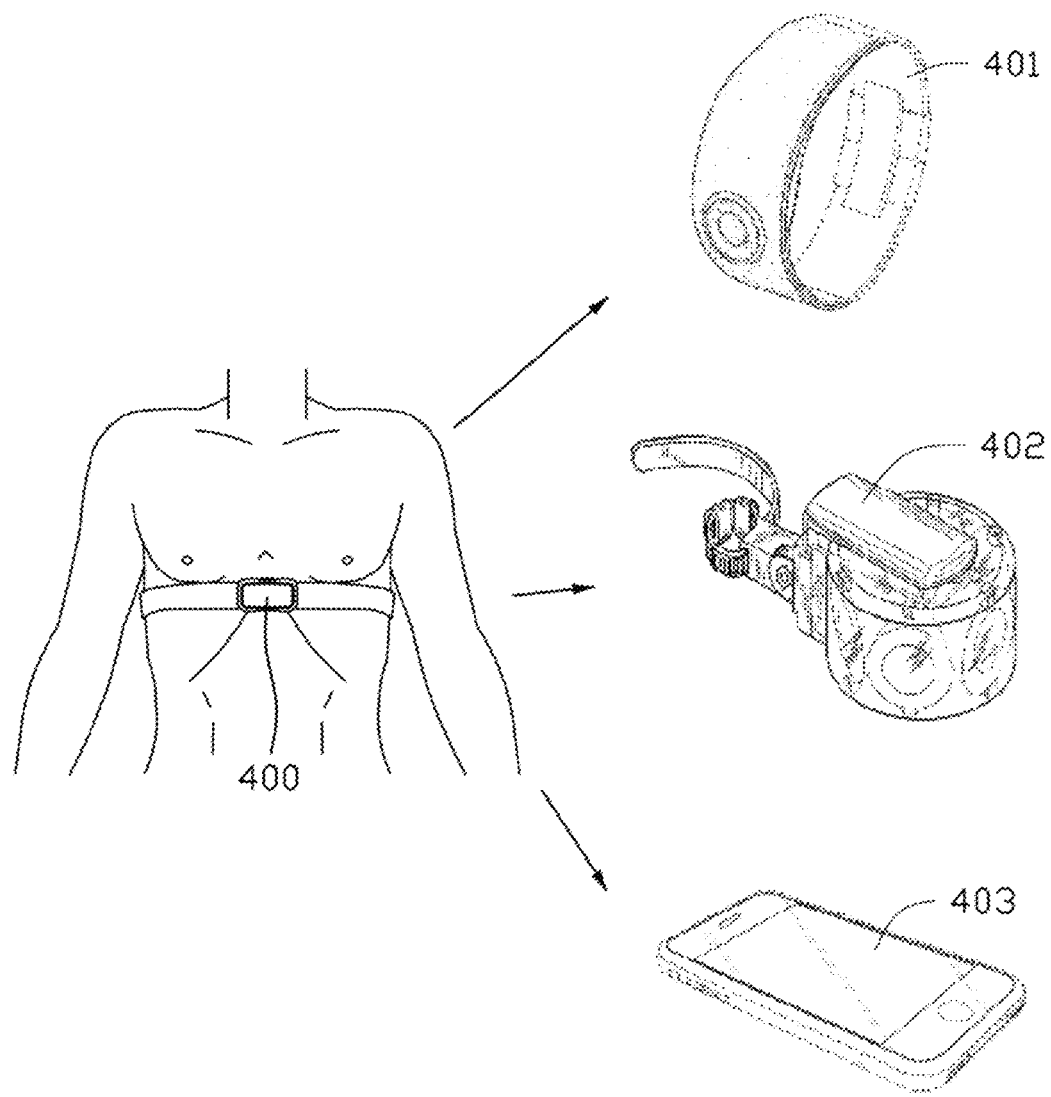
FIG. 4 is a schematic illustration of types of exemplary exercise assistive devices according to another embodiment of the present invention.

FIG. 4 is a schematic illustration of types of exemplary exercise assistive devices according to another embodiment of the present invention.

Referring to FIG. 4, the exercise assistive device 100 may be separate into a first device and a second device. The first device can be configured to wirelessly communicate with the second device. The first device can be a combination of at least one of the sensor module 101, the processing module 102, the user interface 103 or the storage module 104. The second device can be a combination of at least one of the sensor module 101, the processing module 102, the user interface 103 or the storage module 104. Based on the collaboration of the first device and the second device, the function of the original exercise assistive device 100 can be completely operated as well.

The first device can be part of a wearable device 400 to be worn around a human's body part, for example, a chest, a wrist, an arm, waist, or a leg, to sense and measure the physiological signals from the body part. The second device can be a part of an extended device such as a bracelet, a cycling meter, a smart phone, running watches, fitness equipment, or any combination thereof.

To clearly illustrate, the aforementioned extended device may be a bracelet 401 that comprises a user interface that visually illustrates the stamina level of a user in a range, for example from 100% to 0%. The aforementioned extended device may also be an indicator light 402 equipped at the rear of a cycle that illuminates different colors or gleams according to the stamina level of a cyclist. The aforementioned extended device may also be a smart phone 403 that may receive the information, process the information, visually illustrate the stamina level of a user in a range from 100% to 0% (optionally), and even upload the information to the Internet (optionally), such as social network or many types of applications.

Figure 5:
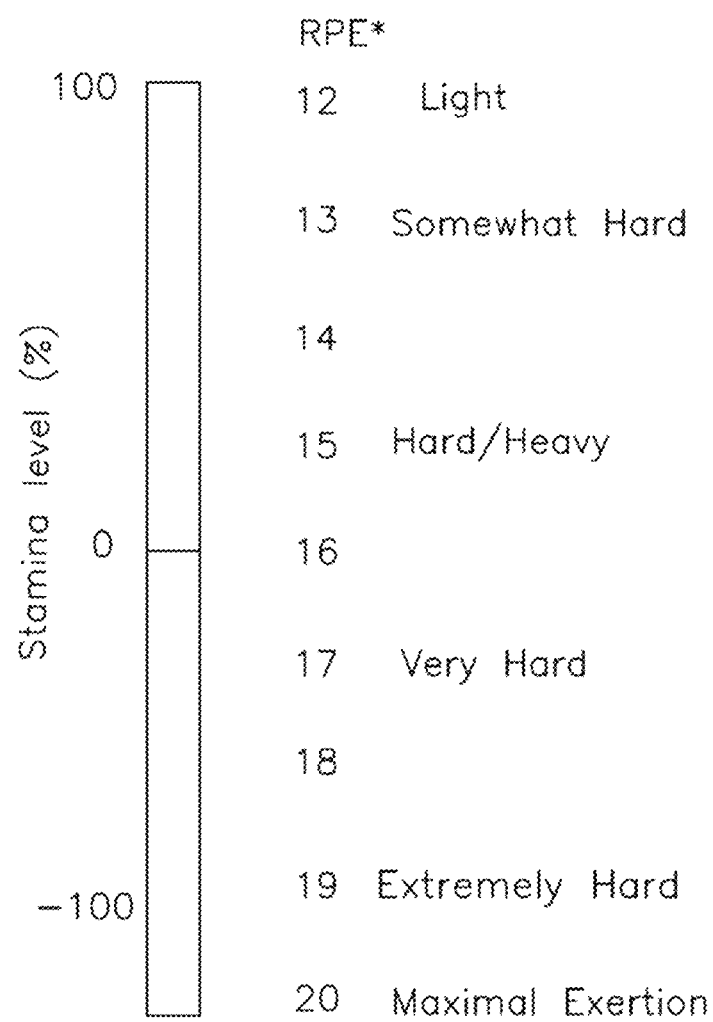
FIG. 5 is a schematic illustration of the mapping concept between stamina level and RPE.

FIG. 5 is a schematic illustration of the mapping concept between stamina level and RPE.

Referring to FIG. 5, a mapping between the stamina level and rating of perceived exertion (RPE) is disclosed. In addition, the type of RPE may be Borg Rating of Perceived Exertion Scale. The stamina level is a measurement resulting from real-time exercise intensity. The stamina level recovers when fatigue level, blood lactate level (the lactate acid concentration in the blood stream) or real-time exercise loading decreases. On the other hand, the stamina level decreases when fatigue level, blood lactate level (the lactate acid concentration in the blood stream) or real-time exercise loading increases.

The stamina level can be presented within a certain range, such as 100% to 0%. In addition, the stamina level is at least partially related to the RPE scale linearly or non-linearly. For example, a RPE between 11 and 13 suggests that exercise intensity is being performed at a moderate level by the user of the exercise assistive device 100. That is to say, the user may experience "light" muscle fatigue or breathing, and thus a RPE between 11 and 13 may correspond to a 100% stamina level.

On the other hand, a RPE between 15 and 17 suggests that exercise intensity is being performed at a much higher level by the user of the exercise assistive device 100. That is to say, the user may experience "hard/heavy" muscle fatigue or breathing, and thus a RPE between 15 and 17 may correspond to a 0% stamina level.

To clearly illustrate in an example, the stamina level at 100% maps to a RPE at 12, and the stamina level at 0% maps to a RPE at 16, where the user can recovers from 0% back to 100% stamina level in a time period, such as 8 to 12 minutes preferably.

Moreover, in a perspective that takes heart signal as input of the exercise assistive device 100 as an example, the RPE scale is linearly or nonlinearly proportional to the heart rate, and thus the stamina level is also linearly or nonlinearly proportional to the heart rate. In another example, the stamina level of each user is normalized to a fixed range according to the maximum and minimum heart rate.

It should be noticed that although the aforementioned heart rate is disclosed for mapping and normalizing with the RPE scale and the stamina level, other physiological signal can also be implemented. Also, it should be noticed that the stamina level can be a negative value, and the negative value can be used for the automatic stamina category adjustment calculations, which will be further explained in the following paragraphs.

FIG. 6 a schematic illustration of the relationship between exemplary stamina categories and the fitness condition of a user.

Referring to FIG. 6, the stamina category is classified into 10 levels, SC1 to SC 10. Different stamina category corresponds to different person's physical strength and endurance. For the user that rarely exercises, the stamina category may be initially set to category 1 (SC1), in the case of a professional athlete, the stamina category may be initially set to category 10 (SC10).

To further elaborate, the stamina category can be determined by the biological information input by the user, and can be modified according to the user's responses during an exercise, more specifically the stamina level change. For example, the exercise assistive device 100 can comprises a default database stored in the storage module 104 that determines the user's stamina category according to the user's biological information such as age, gender, weight, height and the user's exercise routine data (i.e. the information of the stamina category stored in the storage module after the last exercise of the user). The user's biological information or exercise routine data (i.e. the stored stamina category associated with the last exercise of the user) can be inputted by the user through the user interface 103, or can be retrieved from other devices.

No matter what the stamina category is initially set to (i.e. based on biological information of the user or information of a stored stamina category in the exercise assistive device 100), the stamina category for the user is automatically adjusted to a higher stamina category when the stamina level reaches certain thresholds while the user continues with the exercise without severe fatigue, and thus the stamina category adjustment automatically adapts to the user's progression in fitness level. Namely, as the user's physical condition improves, the stamina level maps to the appropriate RPE scale based on the current stamina category of the user, thus reflecting an accurate stamina level. The aforementioned stamina category adjustment can be regarded as an auto-RPE mechanism.

Figure 7:
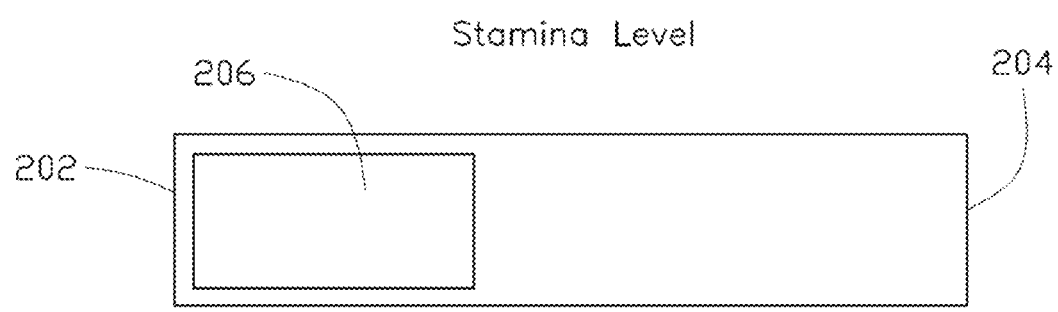
FIG. 7 is a schematic illustration of an exemplary stamina level indicator according to at least one embodiment of the present invention.

FIG. 7 is a schematic illustration of an exemplary stamina level indicator according to at least one embodiment of the present invention.

Referring to FIG. 7, the stamina level is illustrated as a bar, with an upper boundary 204 indicating a 100% stamina level, and a lower boundary 202 indicating a 0% stamina level. Another graphical illustration, for example, a block 206 that is distinguishable from the bar by color, shape or style, represents the current stamina level of the user. The block 206 changes shape, color or style as the current stamina level of the user increases or decreases.

The upper boundary 204 may correspond to an anaerobic threshold, where lactate, more specifically, lactic acid, starts to accumulate in the blood stream due to exercise. The lower boundary 202 may correspond to a certain threshold level for lactic acid concentration, where the user feels exhausted. The threshold level of the lower boundary 202 can be different for each stamina category as each user's endurance to exercise intensity is different. Although the illustration of stamina level is implemented in the form of a bar shape, it is not limited to a bar, and can be implemented with various visual illustrations.

Figure 8:
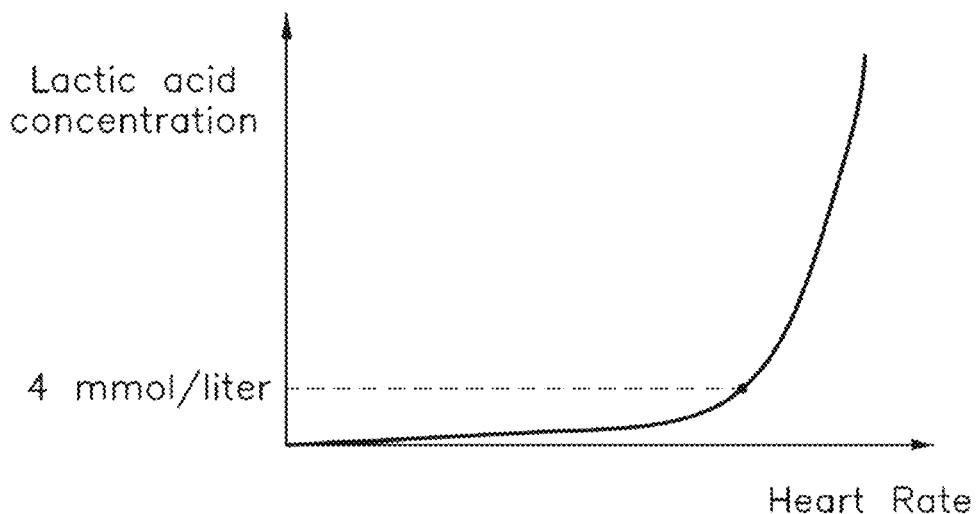
FIG. 8 is a schematic illustration of the correlation between lactic acid concentration and heart rate.

FIG. 8 is a schematic illustration of the correlation between lactic acid concentration and heart rate.

Referring to FIG. 8, the anaerobic threshold for the abovementioned upper boundary 204 is defined as the exercise intensity at which the lactic acid concentration reaches a concentration of 2~6 mmol per liter (at rest it is around 1 mmol per liter).

For example, a 4 mmol per liter of lactate acid concentration is defined as 100% stamina level, and any concentration below 4 mmol per liter is considered as the user's operating at 100% stamina level.

The definition of the aforementioned anaerobic threshold may correlate with approximately 65% to 85% of the maximum heart rate. In addition, the maximum and minimum heart rate of the user is evaluated by age, gender, the rest state of the user, height and weight.

To replace the aforementioned definition of the anaerobic threshold, a certain gradient of the lactic acid concentration and heart rate correlation curve can be defined as 100% stamina level. For example, the 100% stamina level is a point with a gradient value on the curve just before steep incline, which also corresponds approximately to the lactic acid concentration between 2~6 mmol per liter.

It is well known in the art that a lactic acid concentration of 4 mmol per liter is considered as a threshold between aerobic exercise and anaerobic exercise. With aerobic exercise, oxygen is carried through the user's breath to the muscles giving them the energy needed to sustain the effort. With anaerobic exercise, the exercise intensity is high enough to trigger lactic acid formation, which causes discomfort and fatigue at sustained levels.

Figure 9:
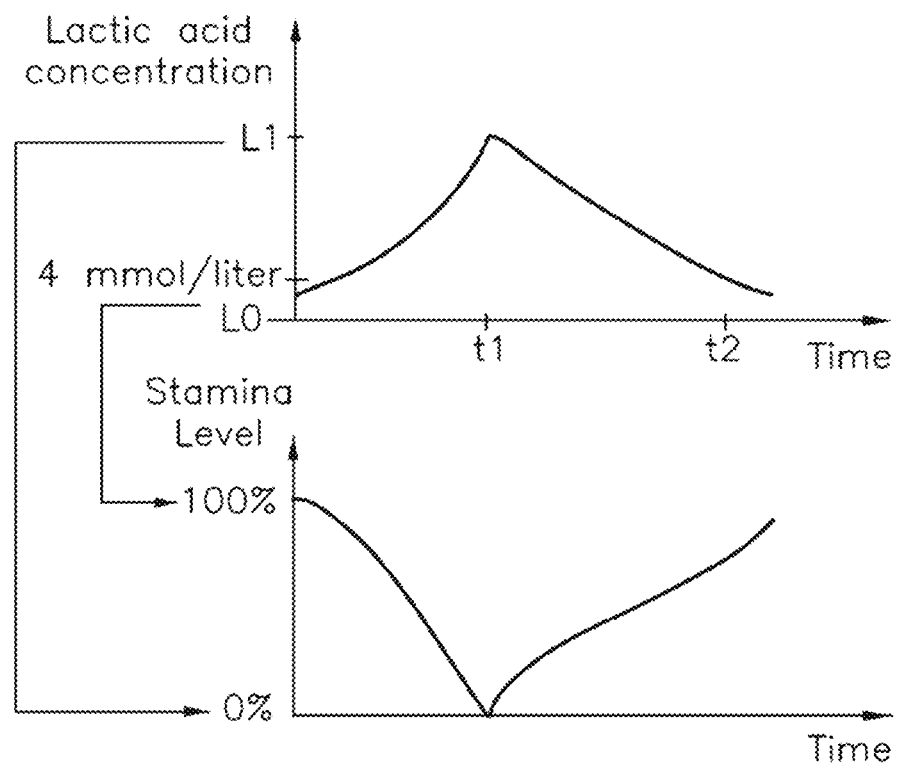
FIG. 9 is a schematic illustration of the changes in lactic acid concentration with respect to the exercise time period of a user and the mapping between lactic acid concentration and stamina level.

FIG. 9 is a schematic illustration of the changes in lactic acid concentration with respect to the exercise time period of a user and the mapping between lactic acid concentration and stamina level.

Referring to FIG. 9, the stamina level of a user with particular stamina category is set to 100% when the lactate acid concentration is at a range of 2~6 mmol per liter. As the user continues with the exercise, the lactate acid concentration increases while the stamina level decreases. Once the lactate acid concentration reaches a threshold, i.e. at L1 lactic acid at t1 time, the user's stamina level reaches substantially 0%. Namely, the user's rate of perceived exertion scale is at approximately 15 to 17, the user may be suggested to choose to decrease the exercise intensity to remove the accumulated lactic acid and thus the stamina level recovers from 0% to 100% during t1 to t2 time frame. It should be noticed that the recovery from 0% to 100% is not necessary, but a recovery from 0% to a certain percentage is better for a user to improve his/her performance during the exercise or competition.

Referring back to FIG. 7, the value for the lower boundary 202 is determined based on the abovementioned t1 to t2 time for the lactic acid concentration to decreases to a predetermined value, for example less than 4 mmol per liter. Regardless of stamina category, the time for different user to fully recovered, for example from 0% to 100% stamina level, is similar, for example, approximately 8 to 12 minutes.

Figure 10:
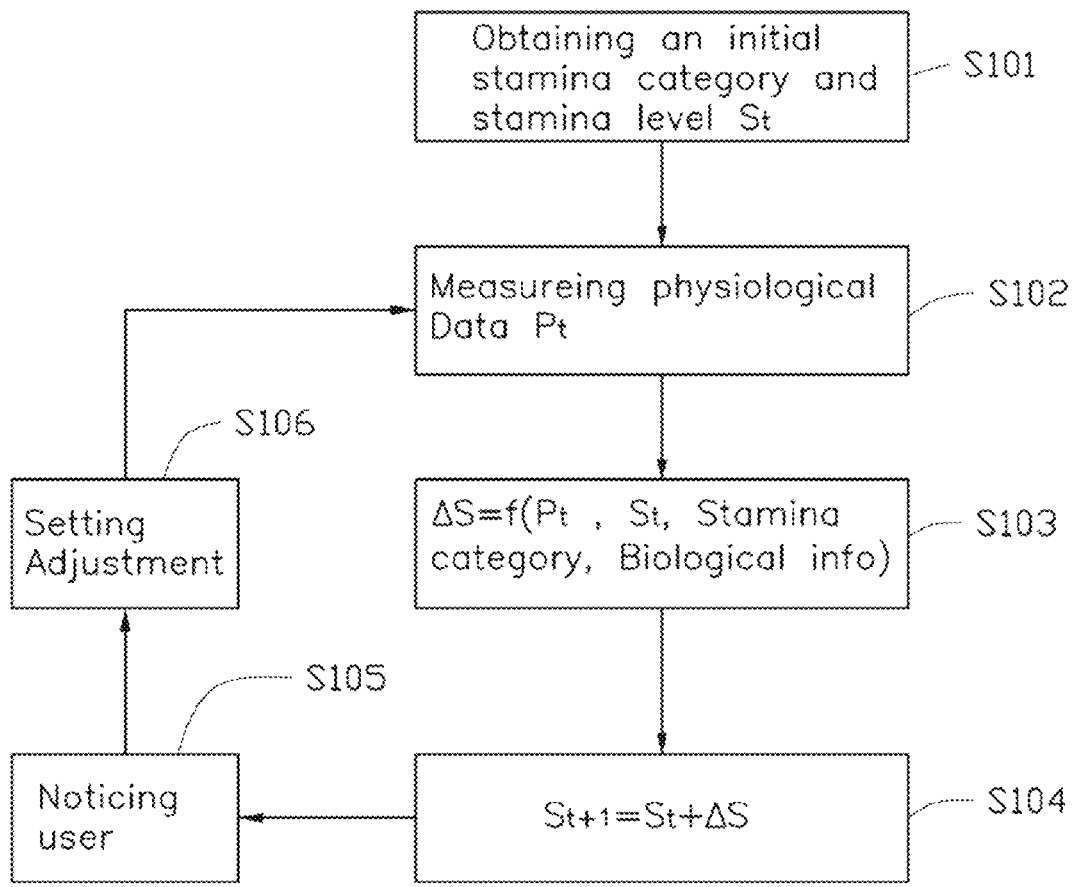
FIG. 10 is a flowchart of a method for estimating stamina level according to at least one embodiment of the present invention.

FIG. 10 is a flowchart of a method for estimating stamina level according to at least one embodiment of the present invention.

Referring to FIG. 10, in step S101, the exercise assistive device 100 first sets the user's initial stamina category and stamina level based on the user's biological information or information of a stored stamina category in the exercise assistive device. The information of the stored stamina category mainly relates to the condition of the user during the last exercise.

In step S102, the physiological information of the user is obtained through the sensor module 101. The physiological information $P_t$ can be current heart rate, activity intensity, oxygen consumption, or any combination thereof.

In step S103, the stamina difference ($\Delta S$) is calculated based on physiological information ($P_t$), the current stamina level ($S_t$), the initial stamina category and biological information.

Then, In step S104, the subsequent stamina level $S_{t+1}$ is calculated by adding $S_t$ and $\Delta S$. In step S105, the user is notified when the stamina level decreases or increases to some specific thresholds. In step 106, the initial stamina category can remains at the current level or adjusts to a higher level according to the $S_{t+1}$ (i.e. from SC 3 to SC4).

It should be noticed that the exercise assistive device 100 updates information of the stored stamina category based on the adjustment of the initial stamina category. Also, It should be noticed that the steps S102 to S106 operates iteratively in the exercise assistive device 100, and thus the auto-RPE mechanism remains active during the exercise or competition of the user.

Figure 11:
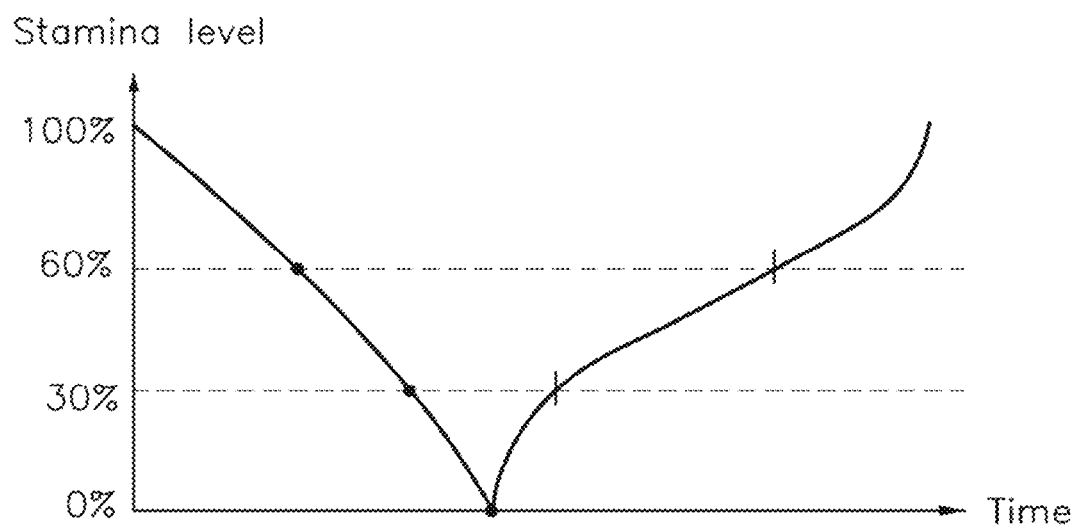
FIG. 11 is a schematic illustration of the exemplary conditions for sending notifications to a user according to at least one embodiment of the present invention.

FIG. 11 is a schematic illustration of the exemplary conditions for sending notifications to a user according to at least one embodiment of the present invention.

Referring to FIG. 11, a notification can be triggered at a stamina level equal to or substantially equal to 0% or other predetermined values no more than 50% or no less than 50%. For example, a notification may be triggered when the stamina level drops to 60%, 30% or 0%. In addition, the notification may also be triggered when the stamina level recovers to 30% or 60%.

The notification may be any form that allows the users to become aware of the notifications, and examples of the notification can be voice, visual or vibrating notifications send out by the user interface 103 notifying the users that exercise intensity should be lower to reduce fatigue or other health related issues. In addition, different types of notifications can be configured for different stamina level. For example, 3 short vibration notifications can be used when the stamina level drops from 60% and then reaches 30% stamina level; a long vibration notification can be used when the stamina level drops from 30% and then reaches 0% stamina level; and 1 short vibration notification can be used when the stamina level rises from 0% and then reaches 30% stamina level or when the stamina level rises from 30% and then reaches 60% stamina level.

Figure 12:
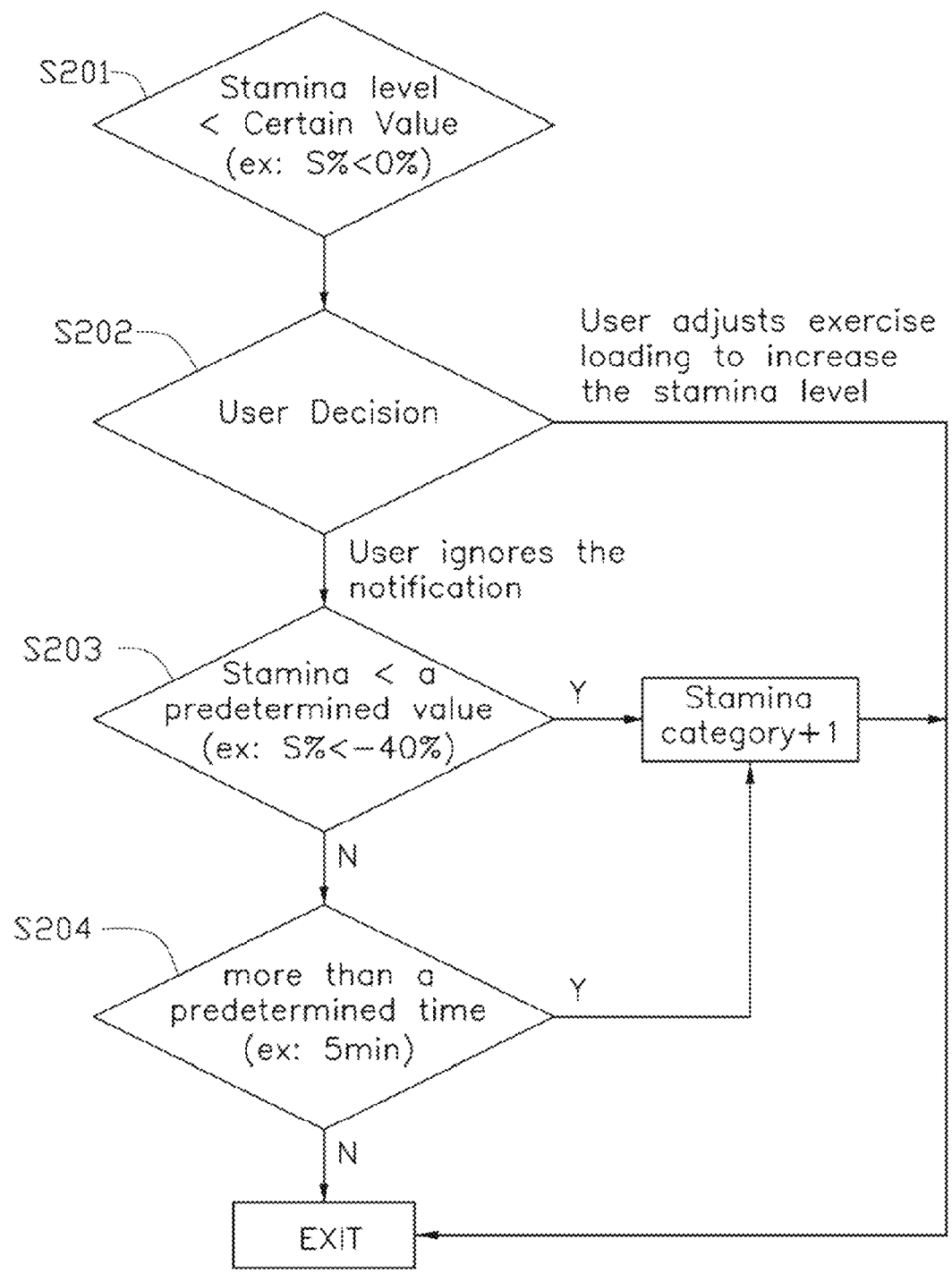
FIG. 12 is a flowchart of a method for adjusting stamina category according to at least one embodiment of the present invention.

FIG. 12 is a flowchart of a method for adjusting stamina category according to at least one embodiment of the present invention.

Referring to FIG. 12, in step S201, when the stamina level drops to a first threshold (or a predetermined value), for example, 0% stamina level, a notification is sent to the user. In step S202, if the user lowers the exercise intensity accordingly and the stamina level starts to recover to above the first threshold, the adjustment ends without modifying the current stamina category.

Then, in step S203, if the user ignores the notification in step S202 and continues with the exercise until the stamina level reaches below a second threshold (or predetermined value), for example, minus 40% stamina level, the stamina category is adjusted to one higher level (i.e., from SC 3 to SC 4).

In step S204, if the user ignores the notification in step S202 and continues with exercise while the stamina level remains between the first and second predetermined value, for example, between 0% and minus 40% stamina level, for more than a first time period (a predetermined time), for example, 4 to 6 minutes, the stamina category is adjust to one higher level (i.e., from SC 3 to SC 4). On the other hand, if the stamina level continuously remains between the first and second predetermined value for less than a first time period (a predetermined time), the adjustment ends without modifying the stamina category.

The stamina level increases or decreases according to each user's exercise intensity during a period of time. Different users with different stamina categories consume different amount of stamina levels during the same period of time. For example, the user with stamina category 3 (SC3) consumes stamina to 0% stamina level faster than the user with stamina category 5 (SC5) assumed the conditions are the same, because the user with SC 5 has more stamina than the user with SC 3.

Thus, if the user's initial stamina category is not appropriate selected, the user may continue with the exercise without feeling severe fatigue after the stamina level reaches 0%, thereby causing sudden situations that fail the exercise or competition. So, the accuracy and effectiveness of the stamina level is based on the appropriate stamina category assigned to the user according to the user's fitness condition. The stamina category can be automatically adjusted to a higher level according to the disclosed adjustment method in FIG. 12.

Figure 13:
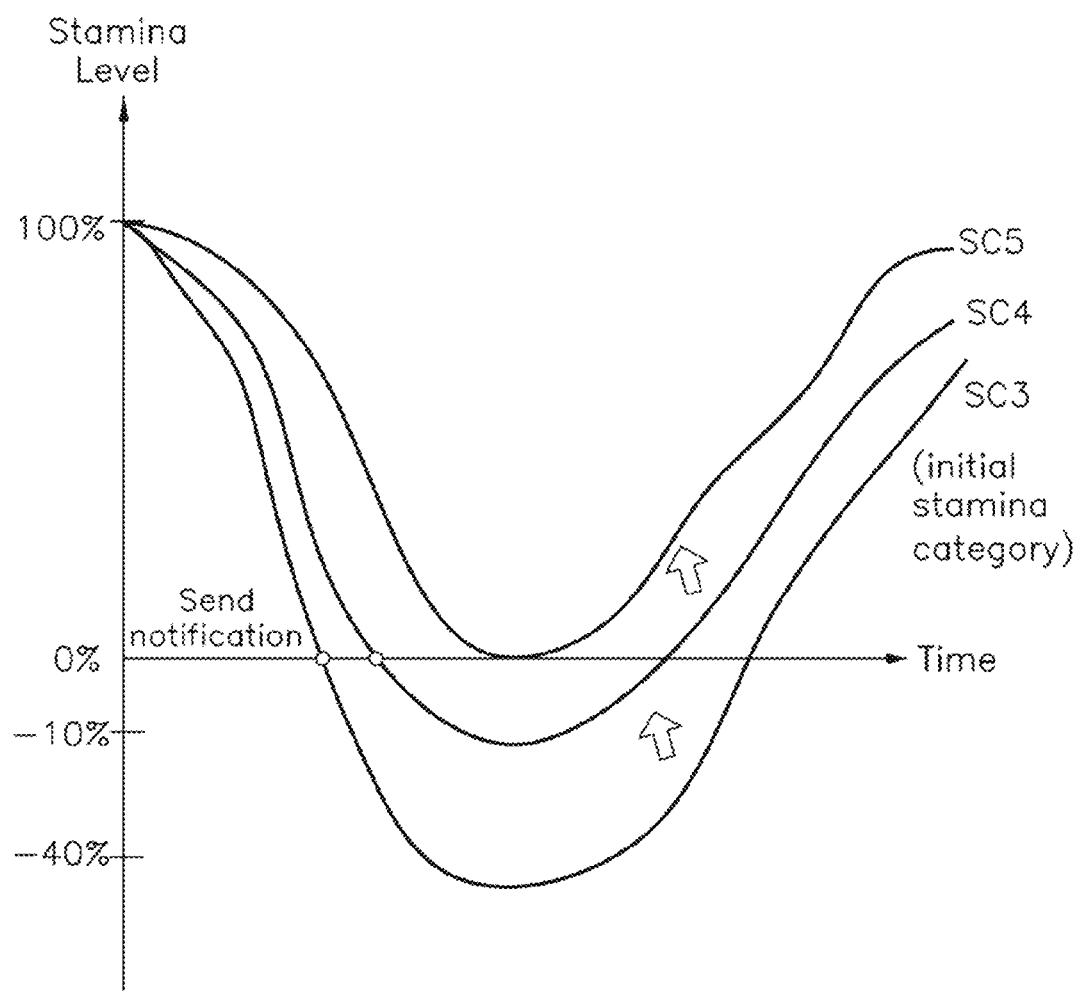
FIG. 13 is a schematic illustration of the exemplary conditions where stamina category can be automatically adjusted in FIG. 12.

FIG. 13 is a schematic illustration of the exemplary conditions where stamina category can be automatically adjusted in FIG. 12.

Referring to FIG. 13, there are two examples of conditions where stamina category can be automatically adjusted. For the user with an initial stamina category of SC3, in a first condition, if the user's stamina level reaches below 0% and the user ignores the notification and continues with the exercise until the stamina level reaches below minus 40%, the user's stamina category is automatically adjusted to SC4.

Then, for the user with an initial stamina category of SC4, in a second condition, if the user's stamina level reaches below 0% and the user ignores the notification and continues with the exercise while the stamina level continuously remains between 0% and minus 10% for more than a first time period (i.e. 5 minutes), the user's stamina category is automatically adjusted to SC5.

Figure 14A:
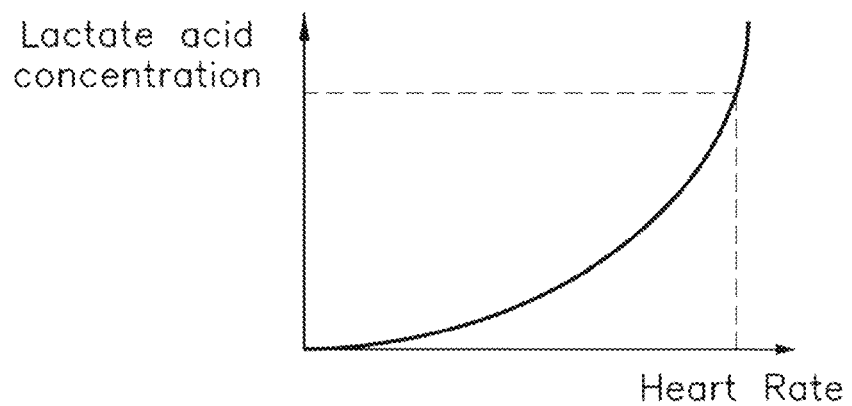
FIGS. 14A and 14B are schematic illustrations of relationship among heart rate, lactate acid concentration and RPE.
Figure 14B:
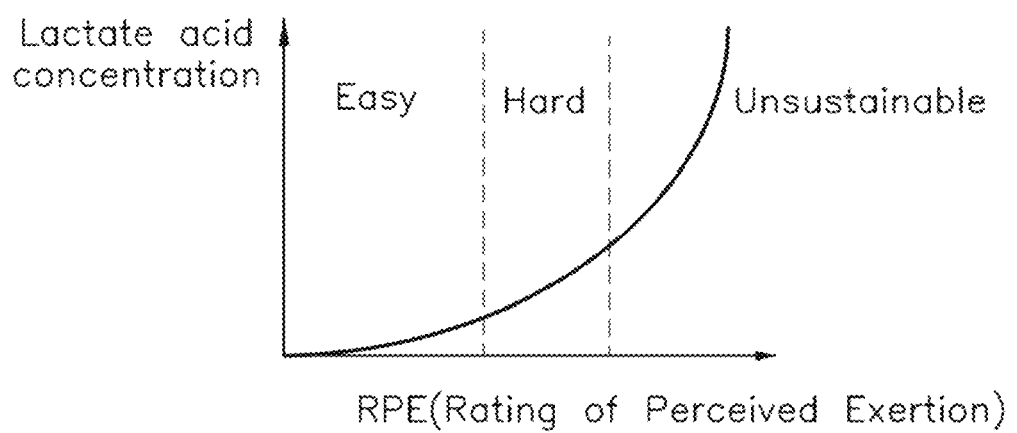
Figure 14C:
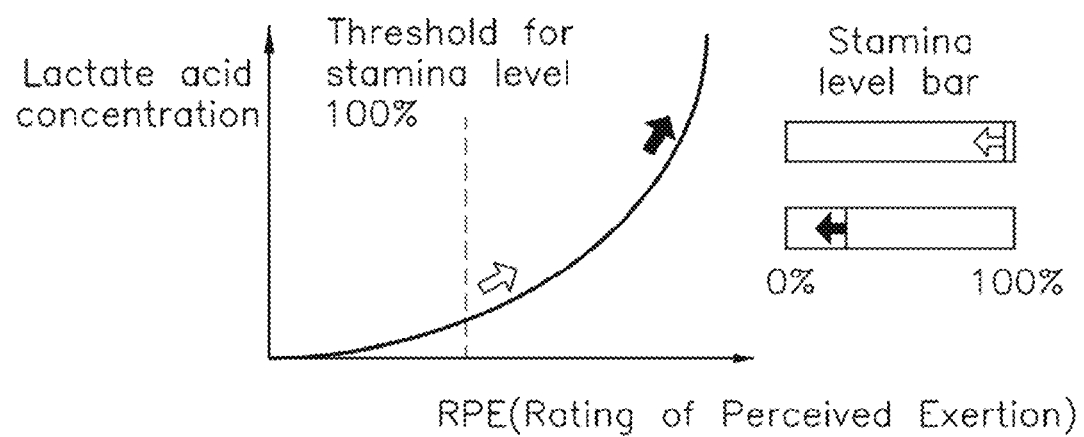
FIG. 14C is the mapping between stamina level and RPE related to lactate acid concentration according to at least one embodiment of the present invention.

FIGS. 14A and 14B are schematic illustrations of relationship among heart rate, lactate acid concentration and RPE, and FIG. 14C is the mapping between stamina level and RPE related to lactate acid concentration according to at least one embodiment of the present invention.

Referring to FIG. 14A, the average heart rate of the user is positively correlated to the lactate acid concentration, which can be approximated with a linear regression model, a non-linear regression model, a piecewise function, other mathematical models or any combination thereof. Thus, the lactate acid concentration associated with the lactate acid accumulated in the blood stream is able to be estimated based on the heart rate of the user.

Referring to FIG. 14B, since the heart rate is positively correlated to or is nearly proportional to the RPE scale, thus the lactate acid concentration is also positively correlated to the RPE scale. When the lactate acid concentration is low, the user experiences "light/easy" in sustaining the exercise effort, and when the lactate acid concentration is high, the user experiences "heavy/hard" or even "unsustainable" in sustaining the exercise effort.

Referring to FIG. 14C, the stamina level is directly correlated to the lactate acid concentration and thus the RPE based on the understanding of FIGS. 14A and 14B. In addition, the stamina level can be represented as a bar-type stamina level indicator as shown in FIG. 7. For example, when the lactate acid concentration reaches above a predetermined threshold in the left side of FIG. 14C, where the stamina level is designated to be 100%, the stamina level indicator starts to decrease as the lactate acid concentration increases following the aforementioned linear or non-linear mathematical models, as illustrated by the white and black arrows in the right side of FIG. 14C.

Figure 15A:
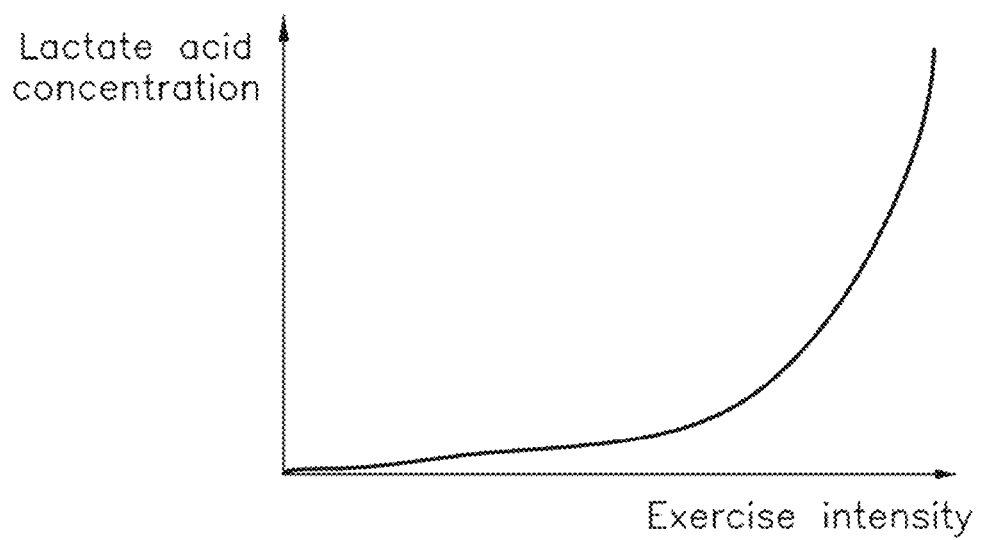
FIGS. 15A and 15B are schematic illustrations of relationship between the lactate acid concentration and exercise intensity or that between the lactate acid concentration and oxygen consumption.
Figure 15B:
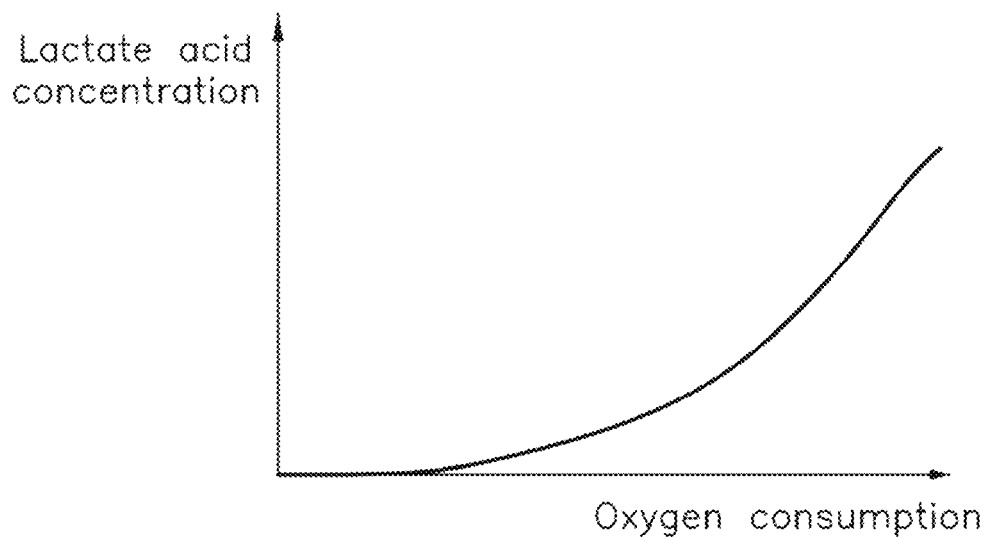

FIGS. 15A and 15B are schematic illustrations of relationship between the lactate acid concentration and exercise intensity or that between the lactate acid concentration and oxygen consumption.

Referring to FIGS. 15A and 15B, the lactate acid concentration associated with the lactate acid accumulated in the blood stream can be estimated based on other physiological signal other than heart rate. For example, the user's exercise intensity or oxygen consumption may be monitored with the sensor module 101, and the aforementioned signals are positively correlated to the lactate acid concentration, which can be approximated with a linear regression model, a non-linear regression model, a piecewise function, other mathematical models, or any combination thereof.

The stamina level can be recorded over a period of time, for example, during an exercise, a race/competition, a challenge and so forth. In addition, the stamina level records can be uploaded to the Internet for further application such as some expressions or interactions in social network. To further elaborate, the stamina level records can be combined with various parameters to fulfill the user's demands for different applications, for example, the stamina level may be combined with at least one of heart rate, velocity, time, map, temperature, humidity, altitude, caloric expenditure, exercising efficiency, estimated maximum distance, or any combination thereof. It should be noticed that the stamina level records may be expressed or exported in real-time or after a period of time.

Figure 16:
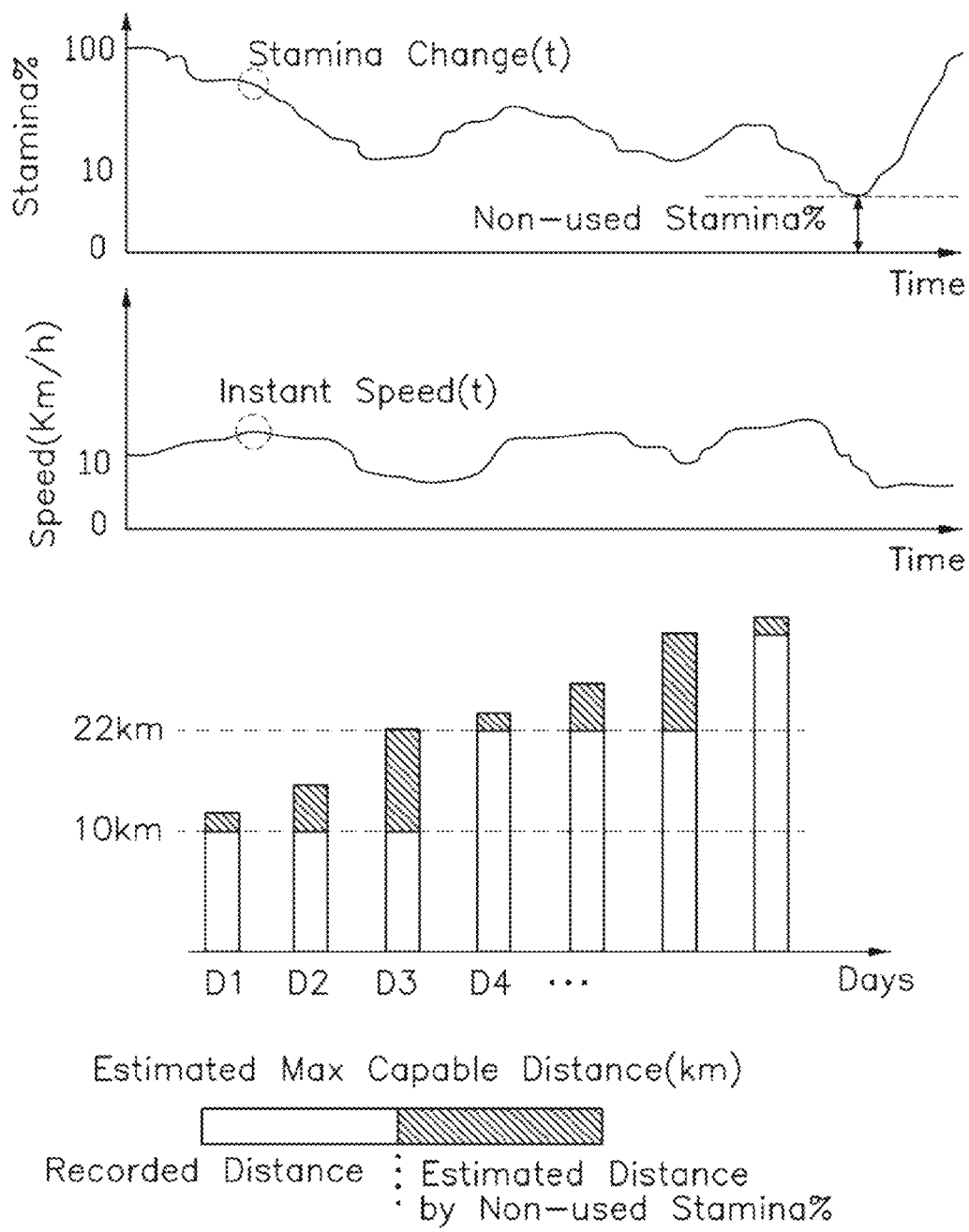
FIG. 16 is schematic illustration of an exemplary application of estimating a user's maximum exercise distance using the user's stamina level and exercise speed.

FIG. 16 is schematic illustration of an exemplary application of estimating a user's maximum exercise distance using the user's stamina level and exercise speed.

To begin with, the users may refer back to the stamina level record histories to evaluate their stamina level changes over certain distance, speed, terrains, temperature or weather condition, and adjust their speed or route for the next exercise session. The users may also monitor their stamina level changes over the same course for several days or weeks to evaluate their progress in fitness levels.

Referring to FIG. 16, the user's stamina level is correlated to the user's exercising speed over a certain period of time. For example, if a user has completed a 5 kilometer running exercise with 10% stamina level remaining, the exercise assistive device 100 can estimate the total running distance if the user is to used up all 100% stamina level for this exercise.

The additional distance associated with the remaining 10% stamina level may be estimated by multiplying the instant speed of the user with the stamina consumption time, and the aforementioned additional distance refers to an estimated distance by non-used stamina percentage, For example, if the additional distance associated with the remaining 10% stamina level is estimated to be 1 kilometer, the exercise assistive device 100 may notifies the user that a 100% stamina corresponds to a total of 6 kilometer running exercise.

Therefore, the estimated maximum distance can be used in designing training plans. For example, the user may have a training plan that has different distance targets in the first day and the consequent days. For example, the exercise assistive device 100 shows that the recorded distance exercised by the user is 10 kilometer in Day 1, but the estimated maximum distance is 11 kilometer since the estimated distance by non-used stamina percentage is 1 kilometer. In Day 3, the estimated maximum distance reaches to 22 km, and thus the user with the exercise assistive device 100 is ready to practice running at a distance of 22 kilometers in Day 4 under proper evaluation.

It should be noticed that different users with different stamina categories may compare their stamina level records with each other to adjust their exercise loading distribution since the stamina level of each user is normalized to a range of 0% to 100%. In another example, a gym coach can monitor the stamina level of all the members in a class and inform each individual to adjust his/her exercise loading accordingly.

Figure 17:
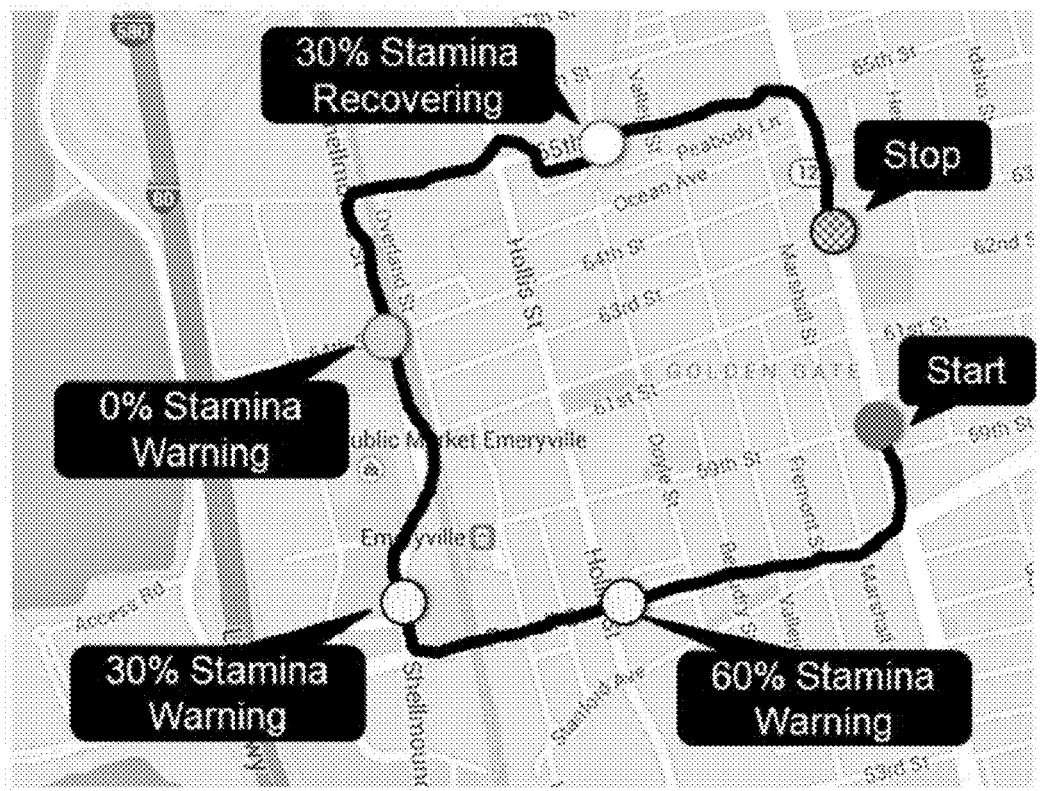
FIG. 17 is schematic illustration of an exemplary application of outputting the user's stamina level in conjunction with a map.

FIG. 17 is schematic illustration of an exemplary application of outputting the user's stamina level in conjunction with a map.

Referring to FIG. 17, the stamina level records can be utilized with GPS data and correlated with a map to evaluate the locations where most users have dramatic decrease in stamina level, for example, at the top of a steep hill.

The aforementioned information may be beneficial to water or food store owners to evaluate the locations to set up their stores. In addition, the aforementioned information may be combined with the information captured by some specific devices, such as a video recorder or a camera, and thus the user's video feeds along with the user's stamina level can be watched through the Internet.

Figure 18:
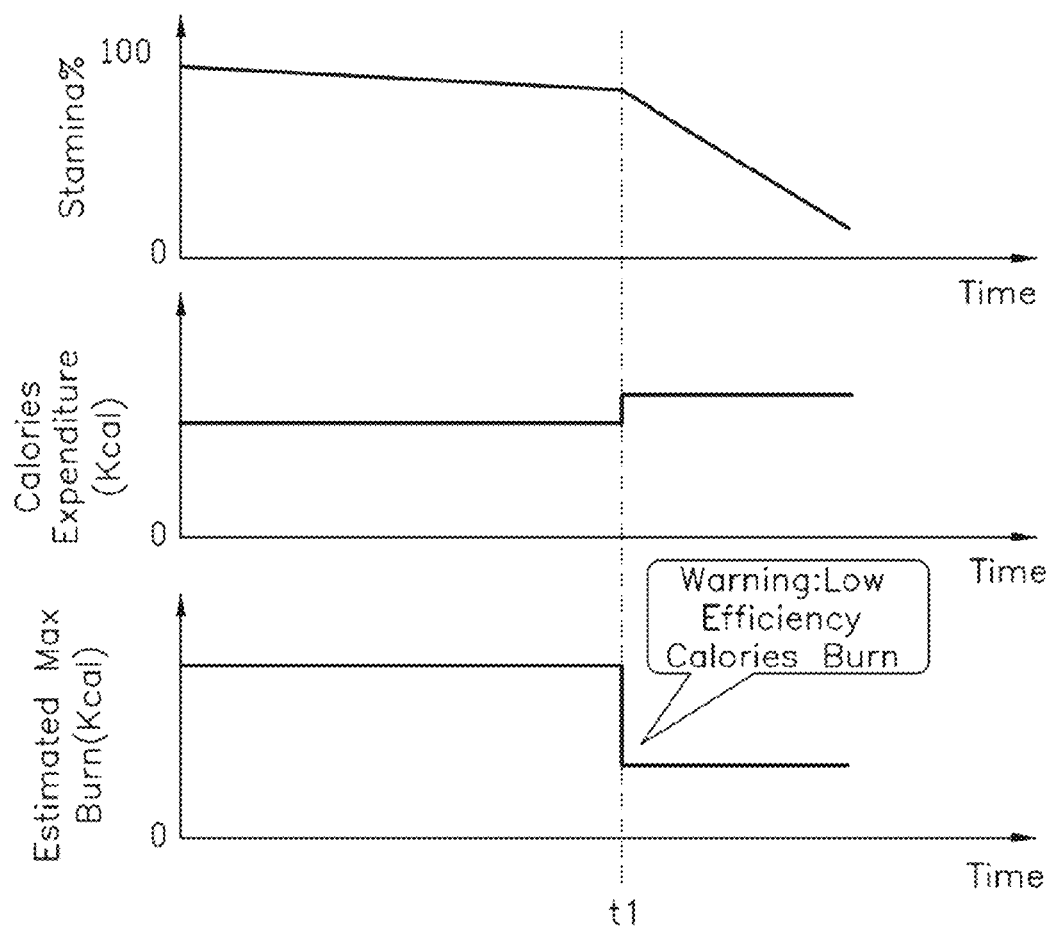
FIG. 18 is schematic illustration of an exemplary application of estimating a user's caloric expenditure by utilizing the user's stamina level.

FIG. 18 is schematic illustration of an exemplary application of estimating a user's caloric expenditure by utilizing the user's stamina level.

Referring to FIG. 18, the user's stamina level can be mapped to the user's caloric expenditure with mathematical models. For example, if a user is exercising with a steady pace, the steady decrease in the stamina level corresponds to a constant caloric expenditure. The total caloric expenditure during the exercise may be estimated by multiplying this constant caloric expenditure with the total time of this exercise. If the user is to increase the exercise loading at time t1, the caloric expenditure becomes higher. However, the user may not be able to sustain with the exercise loading for a long time, and therefore the total caloric expenditure may be lower after time t1. If the main goal for the user is to lose weight by maximizing caloric burns, the exercise assistive device is able to illustrate the correlation between the exercise loadings (i.e. the rate of decreasing in the stamina level) with the total caloric expenditure, and sends notifications to the user suggesting the appropriate exercise loading.

Previous descriptions are only embodiments of the present invention and are not intended to limit the scope of the present invention. Many variations and modifications according to the claims and specification of the disclosure are still within the scope of the claimed invention. In addition, each of the embodiments and claims does not have to achieve all the advantages or characteristics disclosed. Moreover, the abstract and the title only serve to facilitate searching patent documents and are not intended in any way to limit the scope of the claimed invention.

What is claimed is:

1. A method for monitoring stamina of a user by managing an exercise assistive device, comprising:
    setting an initial stamina category based on biological information of the user or information of a stored stamina category in the exercise assistive device;
    sensing a physiological signal of the user using a sensor module;
    estimating, using a processing module, a stamina level based on the physiological signal and the initial stamina category;
    sending a notification to the user through a user interface when the stamina level reaches a first threshold;
    adjusting, using the processing module, the initial stamina category if the stamina level reaches below the first threshold and meets a first condition or a second condition;
    wherein the first condition is met if the stamina level continuously remains between the first threshold and a second threshold for a first time period, and the second condition is met if the stamina level reaches below the second threshold; and
    updating information of the stored stamina category in the exercise assistive device based on the adjustment of the initial stamina category.

2. The method of claim 1, wherein the physiological signal comprises at least one of (1) fatigue signal such as heart rate, breathing pattern, and movement speed, (2) energy signal such as glycogen concentration, and oxygen concentration, and (3) activity signal such as exercise intensity.

3. The method of claim 2, wherein the fatigue signal related to heart rate is monitored by an ECG sensor or an optical sensor.

4. The method of claim 2, wherein the activity signal is monitored by at least one of a gyroscope, an accelerometer, a step counter, a cadence monitor, a speedometer, and a power meter.

5. The method of claim 1, wherein the biological information comprises: body dimension information such as height, weight, age, and gender.

6. The method of claim 1, wherein the initial stamina category is classified into a plurality of stamina category levels according to the user's fitness level, wherein the user's fitness level is determined by the biological information of the user.

7. The method of claim 6, wherein the stamina category is classified into 10 levels.

8. The method of claim 1, wherein the steps of estimating the stamina level comprises: (1) mapping the physiological signal to lactate acid concentration with a mathematical model that varies with the initial stamina category of the user, wherein the mathematical model utilizes at least one of a linear regression model, a non-linear regression model, and a piecewise function; (2) mapping the lactate acid concentration to the amount of increase or decrease of the stamina of the user, and (3) summing up the stamina level and the amount of increase or decrease of the stamina of the user.

9. The method of claim 8, wherein the stamina level has a range at least from 0% to 100%.

10. The method of claim 9, wherein the 100% stamina level corresponds to a range of lactate acid concentration from 2 to 6 mmol per liter.

11. The method of claim 9, wherein the 0% stamina level corresponds to the lactate acid concentration which requires a second time period to decrease to a range of lactate acid concentration from 2 to 6 mmol per liter.

12. The method of claim 9, wherein the first threshold corresponds to the 0% stamina level.

13. The method of claim 1, wherein the notification is sent when the stamina level is at the first threshold or above the first threshold, wherein the notification is a vibrating notification, a voice notification or a visual notification.

14. The method of claim 13, wherein the step of sending the vibrating notification comprises: sending a first vibrating pattern when the stamina level decreases to a third threshold above the first threshold; sending a second vibrating pattern when the stamina level decreases to the first threshold; and sending a third vibrating pattern when the stamina level increases to a fourth threshold above the first threshold.

15. The method of claim 1, wherein the stamina level is outputted to be in conjunction with at least one parameter such as heart rate, velocity, time, map, temperature, humidity, altitude, caloric expenditure, exercising efficiency, or estimated maximum distance.

16. An exercise assistive device, comprising:
a strap; and
an enclosure positioned at the vicinity of a user's heart by the strap, comprising:
a sensor module having at least one electrode to sense an ECG signal of the user:
an user interface adapted to receive biological information and send notification when a stamina level reaches a first threshold;
a storage module adapted to store at least one mathematical model and a stored stamina category; and
a processing module adapted to (1) determine an initial stamina category based on the biological information of the user or information of the stored stamina category in the storage module, (2) estimate a stamina level based on the ECG signal and the initial stamina category, (3) adjust the initial stamina category if the stamina level reaches below the first threshold and meets a first condition or a second condition, wherein the first condition is met if the stamina level continuously remains between the first threshold and a second threshold for a first time period, and the second condition is met if the stamina level reaches below the second threshold, and (4) update information of the stored stamina category in the storage module based on the adjustment of the initial stamina category.

17. The device of claim 16, wherein the ECG signal (1) determines a user's heart rate according to the time intervals between specific ECG waves and (2) is used to filter noises through the identification of its specific characteristics of waveform, such as T wave.

18. The device of claim 16, wherein the biological information comprises: body dimension information such as height, weight, age, and gender.

19. The device of claim 16, wherein the user interface comprises at least one output such as a display, a vibrating component, or a speaker.

20. The device of claim 16, wherein the mathematical model varies with the stamina category of the user, and the mathematical model utilizes at least one of a linear regression model, a non-linear regression model, or a piecewise function.

21. The device of claim 16, wherein the stamina category is classified into a plurality of stamina category levels according to the user's fitness level, wherein the user's fitness level is determined by the biological information of the user.

22. The device of claim 16, wherein the stamina level has a range of at least from 0% to 100%.

23. The device of claim 22, wherein the 100% stamina level corresponds to a range of lactate acid concentration from 2 to 6 mmol per liter.

24. The device of claim 22, wherein the 0% stamina level corresponds to the lactate acid concentration which requires a second time period to decrease to a range of blood lactate concentration from 2 to 6 mmol per liter.

25. The device of claim 22, wherein the first threshold corresponds to the 0% stamina level.

26. The device of claim 16, wherein the notification is sent when the stamina level is at the first threshold or above the first threshold, wherein the notification is a vibrating notification, a voice notification or a visual notification.

27. The device of claim 26, wherein the vibrating notification comprises: a first vibrating pattern when the stamina level decreases to a third threshold above the first threshold; a second vibrating pattern when the stamina level decreases to the first threshold; and a third vibrating pattern when the stamina level increases to a fourth threshold above the first threshold.

28. The device of claim 16, wherein the stamina level is outputted from the user interface to be in conjunction with at least one parameter such as heart rate, velocity, time, map, temperature, humidity, altitude, caloric expenditure, exercising efficiency, or estimated maximum distance.

29. An exercise assistive device, comprising:
a strap; and
an enclosure positioned directly or indirectly on a user's skin by the strap, comprising:
a sensor module having at least one optical sensor to sense a physiological signal of a user;
an user interface adapted to receive biological information and send notification when the stamina level reaches a first threshold;
a storage module adapted to store at least one mathematical model and a stored stamina category; and
a processing module adapted to (1) determine an initial stamina category based on the biological information of the user or information of the stored stamina category in the storage module, (2) estimate a stamina level based on the physiological signal and the initial stamina category, (3) adjust the initial stamina category if the stamina level reaches below the first threshold and meets a first condition or a second condition, wherein the first condition is met if the stamina level continuously remains between the first threshold and a second threshold for a first time period, and the second condition is met if the stamina level reaches below the second threshold, and (4) update information of the stored stamina category in the storage module based on the adjustment of the initial stamina category.

30. The device of claim 29, wherein the physiological signal comprises at least one of (1) fatigue signal such as heart rate, breathing pattern, and movement speed, (2) energy signal such as glycogen concentration, and oxygen concentration, and (3) activity signal such as exercise intensity, and the biological information comprises: body dimension information such as height, weight, age, and gender.

31. The device of claim 29, wherein the stamina level has a range of at least from 0% to 100%, and the 100% stamina level corresponds to a range of lactate acid concentration from 2 to 6 mmol per liter.

32. The device of claim 31, wherein the 0% stamina level corresponds to the lactate acid concentration which requires a second time period to decrease to a range of lactate acid concentration from 2 to 6 mmol per liter.

33. The device of claim 29, wherein the enclosure is placed in the vicinity of the user's forehead, wrist, leg or arm with the strap.

* * * * *